GEORGE H. JOHNSON AND GEORGE MILSOM, OF BUFFALO, NEW YORK.

Letters Patent No. 86,758, dated February 9, 1869.

IMPROVED PROCESS FOR DRYING AND RENOVATING GRAIN.

The Schedule referred to in these Letters Patent and making part of the same.

*To all whom it may concern:*

Be it known that we, GEORGE H. JOHNSON and GEORGE MILSOM, of Buffalo, in the county of Erie, and State of New York, have invented a new and useful Process for Drying and Renovating Grain; and we do hereby declare the following to be a full and exact description thereof.

Our invention relates to the drying and renovating of grain, without handling or moving the same, when stored in bulk in large fire-proof granaries, or "elevator-warehouses," by a new and useful method of heating the entire mass without parching it, of removing from the heated mass all the moisture therein, so fast as the aqueous particles are disengaged or liberated from the grain by the heat, and of subsequently cooling the same.

Heretofore, independent machines and apparatus of various descriptions have been necessarily used, in connection with granaries and elevators, for the purpose of curing the grain to be stored therein, in order to prevent the losses attendant upon the heaping up of large quantities of damp grain in a confined space, but the use of these separate grain-driers involves the necessity of twice handling the entire amount of grain, in passing it to and from the machine, causing great expense and loss of time in the operation. The machines themselves are also costly and expensive in construction and operation.

By means of our invention, these independent grain-drying machines are wholly dispensed with, and we save, not only the large cost of constructing and operating the same, but also the expense incurred in the handling of the grain necessary to their use.

Our novel process consists in the application of heat to and the withdrawal of moisture from grain, after it has been stored in bulk in fire-proof bins, granaries, or elevator-warehouses, by passing currents of hot air through a series of earthenware or other absorbent flues, porous or perforated, or through minutely-perforated or porous and absorbent hollow partition-walls, so placed or built, within the grain-bin or warehouse, as to form continuous air-passages extending entirely through the same.

The currents of hot air passing through the porous flues, or the spaces within the porous hollow walls, will not only heat the mass of grain stored around, about, and between them, so as to set free the moisture therein, but will create an inward draught or suction at every pore or perforation of the flues, quickening the natural absorbent power thereof, so that they will operate to draw in and carry off this moisture with great rapidity.

To carry our process into practical operation, we divide the inner space of any suitably-constructed fire-proof granary into a series of compartments, by means of hollow vertical walls built of hollow bricks, made of porous, unburnt clay, of unglazed earthenware, or other suitable porous absorbent material, whose porosity we increase generally by piercing the same with numerous minute perforations, or artificial pores.

The flues, or the hollow spaces within the walls so constructed, are made to extend and open through the floor or bottom of the granary, and are connected with the hot-air chamber or chambers of one or more suitable furnaces, so that the heat from the furnaces shall pass up and be distributed uniformly to all of them. They may be also all united, and connected at their upper ends by and with a flue communicating with one or more chimneys, to carry off, with a strong current, the hot air and vapor passing through and discharged from them, or be otherwise provided with a discharging-vent.

By means of suitable valves the connections of these air-spaces or flues may be cut off from the furnaces, and be opened to the outer air, or to a flue connecting the same with a fan-blower.

We prefer to use, in our process, cylindrical grain-bins, divided interiorly, by means of concentric porous hollow walls, into a series of annular grain-spaces. We contemplate, however, the use of distinct porous flues, instead of continuous hollow porous walls, to extend through the interior of the grain-bin or granary, and to communicate with hot-air furnaces, or the outer air, at their lower ends, and suitable chimneys at their upper ends.

Our process, combining the liberating-action of heat applied to the grain, and the absorbing capillary attraction of the porous flues, or hollow walls, with the withdrawing-force obtained by means of the strong inward draught or suction created in every pore by currents of hot air passing through the flues or the spaces within the walls, is singularly effective in accomplishing the end sought therein. By means of the process, we are enabled to dry and renovate grain in bulk, in large quantities, in the very granary or warehouse wherein it is placed for storage, and thereby, with but a very small additional expense in the construction of the granary, save the cost of constructing and operating independent grain-drying machines, and avoid also the loss of time and the great expense attendant upon the removal of the grain to and from such separate machines.

Our process is also eminently useful, because we avoid therein all danger of parching the grain, and killing the germ thereof, as is often done in the metal grain-driers now in use, wherein the grain is submitted to excessive heat, in order to dry it very rapidly, and thus gain time. The material of our flues, and their porous nature, prevent all possibility of overheating, whilst the action of the heat, drawing off the moisture as fast as it is liberated, with a constant current, sweetens, purifies, and cures the grain, without hardening it. It is also specially adapted to the drying and curing of malt in kilns properly constructed for the purpose.

We do not herein claim porous tubes or hollow walls in combination with grain-bins, nor specially, any form or description of apparatus for carrying our process into effect.

Nor do we claim forcing cold or hot air into a grain-bin or granary, so as to permeate and pass through and amid the grain therein.

The object of our invention is to draw out, by outward currents, the air and moisture from the bin; and having fully described the said invention,

We claim as new, and desire to secure by Letters Patent—

Our improved process for drying and renovating grain, when stored in fire-proof granaries or warehouses, by subjecting it to the influence of currents of hot air passing through porous or perforated flues, or hollow walls, of any absorbent material, extending through the granary, whereby the grain shall be moderately heated, and its moisture simultaneously absorbed and rapidly carried off, substantially as herein set forth.

The foregoing specification of our improved process for drying and renovating grain, when stored in fire-proof warehouses, signed by us, this 14th day of January, 1869.

GEO. H. JOHNSON.
GEO. MILSOM.

Witnesses:
DAVID A. BURR,
HENRY M. GAYLORD.